United States Patent [19]  
Althausen et al.

[11] 4,082,251  
[45] Apr. 4, 1978

[54] MIXING HEAD FOR A MACHINE FOR PRODUCING MULTICOMPONENT PLASTICS

[75] Inventors: Ferdinand Althausen, Neunkirchen; Rainer Raffel, Siegburg, both of Germany

[73] Assignee: Maschinenfabrik Hennecke GmbH, Leverkusen, Germany

[21] Appl. No.: 575,770

[22] Filed: May 8, 1975

[30] Foreign Application Priority Data

May 15, 1974  Germany ............................. 2423631

[51] Int. Cl.² ............................................. B01F 15/02
[52] U.S. Cl. ................................. 366/179; 137/625.4; 366/76; 366/333
[58] Field of Search ................... 259/4 R, 4 A, 4 AB, 259/4 AC, 18, 36, 47; 23/252; 137/625.4; 277/24; 251/206; 425/4

[56] References Cited  
U.S. PATENT DOCUMENTS

| 2,836,198 | 5/1958 | McNeill | 251/206 |
| 3,132,568 | 5/1964 | Strader | 277/24 |
| 3,849,074 | 11/1974 | Ficklinger | 259/4 R |
| 3,893,481 | 7/1975 | Watts | 137/625.4 |
| 3,905,582 | 9/1975 | Fiorentini | 259/4 R |
| 3,908,966 | 9/1975 | Boden | 259/4 R |

Primary Examiner—Richard E. Aegerter  
Assistant Examiner—L. Footland  
Attorney, Agent, or Firm—Gene Harsh; Joseph C. Gil

[57] ABSTRACT

The two coupled vertical-lift slides of a mixing head for multicomponent plastics are formed with recesses which, in the rest position of the mixing head, form part of the mixing chamber wall so that a stripping rod, whose diameter is greater than the minimum interval between the vertical-lift slides, can be pushed through, preferably perpendicularly of the vertical-lift slides, to scrape out the mixing chamber.

4 Claims, 6 Drawing Figures

MIXING HEAD FOR A MACHINE FOR PRODUCING MULTICOMPONENT PLASTICS

FIELD OF THE INVENTION

This invention relates to a mixing head for machines for producing multicomponent plastics, especially polyurethanebased foams, the machine comprising two hollow lift slides which are guided in bores of a housing, are connected together through a yoke, and whose inlet openings communicate with feedlines, while their injection orifices, in the mixing position of the lift slides, open into a mixing chamber arranged between them.

BACKGROUND OF THE INVENTION

The function performed by mixing heads of this kind is to mix chemical components, for example, a polyol and an isocyanate, with one another for reaction in a mixing chamber and directly to introduce the mixture thus formed into a receiving vessel, preferably into a mold cavity.

Various attempts have already been made to remove from the mixing chamber any residues of the components or of the mixture which adhere to it. In cases where the mixing head is combined with molds, it is now common practice to remove the sprue and the residue left in the mixing chamber from the mold together with the finished molding in order to eliminate the need to flush out the mixing chamber. In the case of slide-type mixing heads, however, it has been found that, on completion of mixing, i.e. when the slide is returned from the mixing position to the rest position, the tail ends of the jets of components issuing from the injection openings cannot be mixed with one another, with the result that they remain adhering to the walls of the mixing chamber without having reacted. The liquid component residues first become tacky and then harden to form a solid, fully reacted mixture residue. Some of the liquid and tacky parts remain adhering to, and foul the walls of the mixing chamber. As a result, the mixing chamber becomes increasingly covered with deposits during operation and has to be cleaned at fairly frequent intervals.

An object of the present invention is to provide a mixing head in which deposits of this kind are prevented from forming.

SUMMARY OF THE INVENTION

According to the invention there is provided a mixing head for a machine for producing multicomponent plastics, comprising a housing; two hollow slides which are guided in bores in the housing between a rest position and a mixing position, and are coupled together through a yoke; a mixing chamber located between the slides, the axis of the mixing chamber being at an angle to a plane in which the slides are situated, and the lateral distance between the slides being less than the width of the mixing chamber as measured in the same direction, the mixing chamber being communicated with ejection openings of the slides when the slides are in their mixing positions; a stripping rod guided in and filling the cross-section of the mixing chamber, the rod being capable of passing between the slides when they are in their rest position by means of recesses in the slides; and feedlines for components to be mixed communicating with inlet openings in the slides. It is noted that the cross-section of the mixing chamber is defined with the slides in their rest position. When the slides are in the mixing position the cross-section of the mixing chamber is somewhat reduced because the recesses in the slides are out of registry with the mixing chambers.

DETAILED DESCRIPTION OF THE INVENTION

Thus, immediately after the lift slides have returned to their starting positions, the stripping rod guided in the mixing chamber can be pushed through the mixing chamber by virtue of the recesses formed in the slides, thus stripping from the walls of the mixing chamber any residues of the mixture components which may be adhering thereto. Providing the stripping rod has a sufficiently long stroke, it can form a plane with the walls of the mold on completion of the filling operation, so that no sprue marks are formed. During the advance movement, the component residues are agitated so that they are able to finish reacting. The stroke of the stripping rod may, if desired, be of such a length that the stripping rod is able to act as an ejector. For this function, the stripping rod can only be actuated after the residue of mixture has finished reacting. It may then immediately be used both as a cleaning element and as an ejector during a single stroke. The axis of the mixing chamber, which is also the axis of the stripping rod, desirably forms at least such an angle with the plane of the vertical-lift slides that full use can be made of the design and operational possibilities. Preferably, the angle is a right angle.

There are already mixing heads in which a plunger is guided in the mixing chamber. Such a plunger is used both as a control plunger and as an ejection plunger. In other words, the components are delivered to the injection openings and to the return lines through control grooves in the plunger. However, this arrangement involves sealing problems, so that the gap between the plunger and the walls of the housing can become blocked through creepage of the components before they have finished reacting. In addition, it is possible by using lift slides to provide for such greater degree of adjustment than with a conventional mixing head.

The axis of the mixing chamber is preferably at a right angle to the plane in which the lift slides are situated. In this arrangement, the dimensions of the recesses are smaller than in any other arrangement while the contact surfaces of the stripping rod with the lift slides are reduced to a minimum. In addition, the travel times of the stripping rod are shorter in this arrangement than in any other arrangement.

In one particular embodiment, the head of the stripping rod is provided with a wear resistant cap. A cap of this kind may be made, for example, of bronze, brass, aluminum or wear-resistant plastics, such as polyurethane elastomers, polyvinyl chloride or polyethylene. The advantage of this cap is that it can be slightly oversized relative to the bore of the mixing chamber, so that, during stripping, it applies to the walls of the mixing chamber a pressure which improves the cleaning effect. A cap of this kind may readily be replaced.

BRIEF DESCRIPTION OF THE DRAWINGS

Two exemplary embodiments of the mixing head according to the invention are diagrammatically illustrated in the accompanying drawings, wherein:

The mixing head shown in FIGS. 1 to 3 comprises a housing 1 formed with bores 2 and 3 in which lift slides 4 and 5 respectively are guided. The slides are coupled together by a yoke 6. The yoke consists of a bearing element 7 and a fixing plate 8 with detents 9 and 10 which engage in corresponding grooves 11 and 12 in the slides 4 and 5. The detents 9 and 10 are arranged crosswise and correspond with associated openings in the slides 4 and 5. The slides 4 and 5 have inlet openings 13, 13a, 13b, and 14, 14a, 14b, respectively. In each slide 4 and 5 a fourth inlet opening is opposite the opening 13a/ 14a in front of the plane of the drawing and, for this reason, is not visible in the drawing. The openings correspond with the crosswise arranged detents 9 and 10. They also correspond with injection openings 15, 15a, 15c and 16, 16a, 16c. Further injection openings coincide with the injection openings 15c and 16c in front of the plane of the drawing in FIGS. 1 and 2. A mixing chamber 17 arranged between the slides 4 and 5 opens into a cavity 18 of a mold 19. A stripping rod 20, which can be fitted with a cap 21 of wear-resistant Duraluminium, is guided in the mixing chamber 17. The slides 4 and 5 are provided with recesses 22 and 23 respectively which enable the stripping rod 20 filling the cross-section of the mixing chamber 17 to be guided between the two lift slides to scrape the walls of the mixing chamber. The recesses 22, 23 are in the form of annular grooves. This is by no means a disadvantage because, during the first mold-filling operation, these annular grooves are filled with material, and during stripping, the stripping rod 20 removes the troublesome excess. The molding components are fed in through feedlines 24 and 25 which open into the housing in the vicinity of the inlet openings 13, 13a, 13b and 14, 14a, 14b. It is noted that only one set of inlet openings and one set of injection openings are utilized at any one time. In FIGS. 1 and 2 only feed openings 13 and 14 and injection openings 15 and 16 are utilized and the other apertures are sealed by contact with the walls of bores 2 and 3 at all times. The various openings may be of different cross-section and the slides may be rotated to bring different openings into operational position as is described in the copending U.S. application Ser. No. 575,838, filed May 8, 1975, of the same assignee entitled "Mixing Head for Machines Producing Multicomponent Plastics," and German Patent Application P 24 23 492.2 filed May 15, 1974 upon which said application claims priority.

Figure 1:
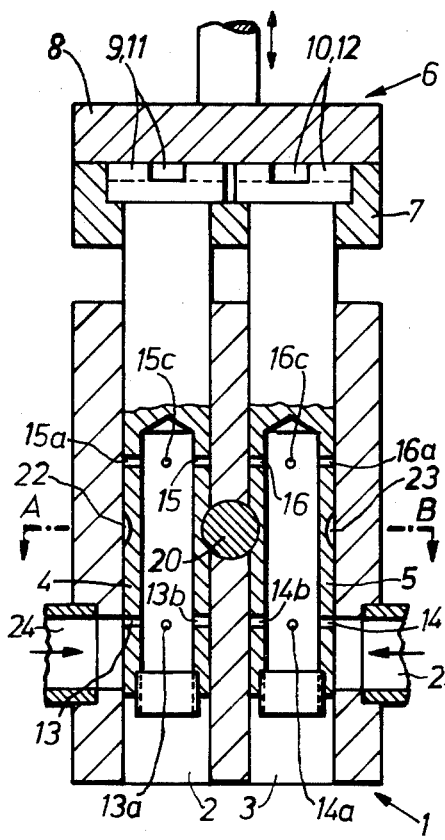
FIG. 1 is a longitudinal section through a first embodiment of the mixing head without any return lines and with the slides in the rest position.
Figure 2:
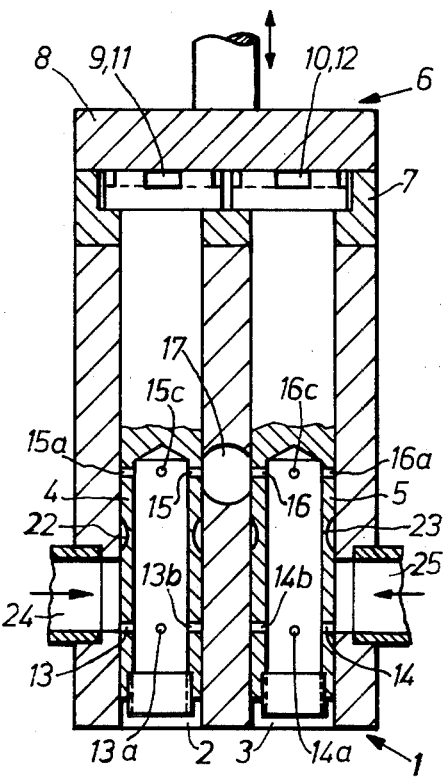
FIG. 2 is a longitudinal section through the mixing head shown in FIG. 1 with the slides in the mixing position.
Figure 3:
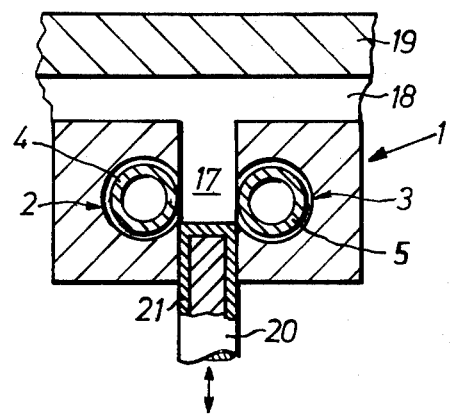
FIG. 3 is a section on the line A-B in FIG. 1.
Figure 4:
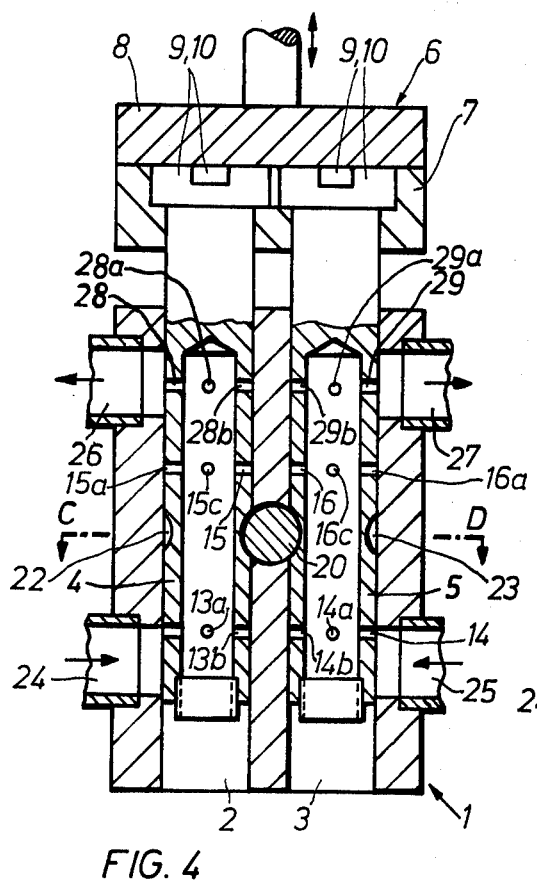
FIG. 4 is a longitudinal section through a second embodiment of the mixing head with return lines and with the slides in the rest position.
Figure 5:
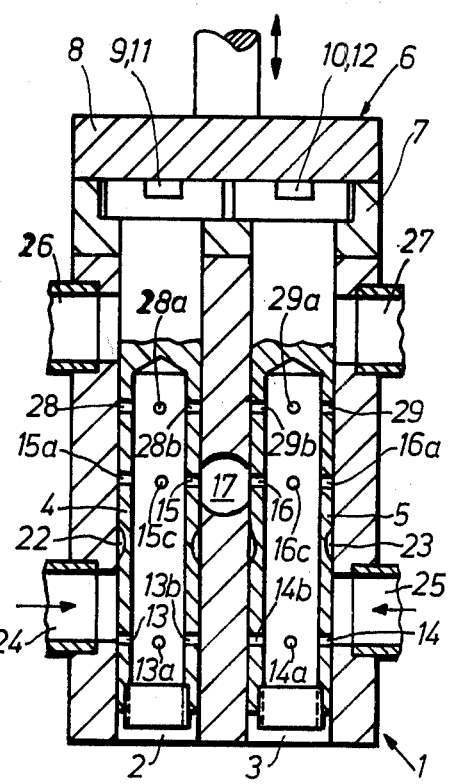
FIG. 5 is a longitudinal section through the mixing head shown in FIG. 4 with the slides in the mixing position.
Figure 6:
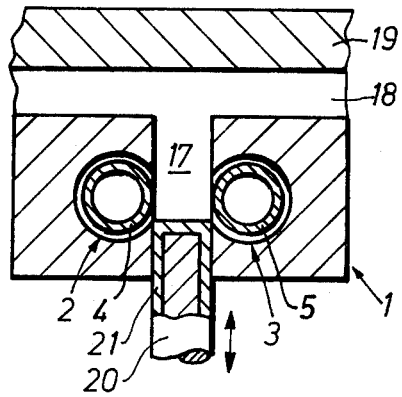
FIG. 6 is a section on the line C-D in FIG. 4.

The only difference between the embodiment shown in FIGS. 4 to 6 and the embodiment shown in FIGS. 1 to 3 is that in the embodiment shown in FIGS. 4 to 6 the housing 1 is additionally provided with return lines 26 and 27. Accordingly, the slides 4 and 5 comprise return openings 28, 28a, 28b and 29, 29a, 29b, respectively arranged in one plane. The injection openings correspond with those return openings associated with them. Further return openings situated in front of the plane of the drawing cannot be seen, although they coincide with the return openings 28a and 29a respectively.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims. 9n

What is claimed is:

1. A mixing head for a machine for producing multicomponent plastics, comprising a housing; two hollow slides which are guided in bores in the housing between a rest position and a mixing position, and are coupled together through a yoke; a mixing chamber located between the slies, the axis of the mixing chamber being at an angle to a plane in which the slides are situated, and the lateral distance between the slides being less than the width of the mixing chamber as measured in the same direction, the mixing chamber being communicated with ejection openings of the slides when the slides are in their mixing positions; a stripping rod guided in and filling the cross-section of the mixing chamber, the rod being capable of passing between the slides when they are in their rest position by means of recesses in the slides; and feedlines for components to be mixed communicating with inlet openings in the slides.

2. A mixing head as claimed in claim 1, wherein the axis of the mixing chamber is perpendicular to the plane in which the slides are situated.

3. A mixing head as claimed in claim 1 wherein the head of the stripping rod is covered by a wear-resistant cap.

4. A mixing head as claimed in claim 3 wherein the wear-resistant cap is made from material selected from the group consisting of bronze, brass, aluminum and wear-resistant plastics.

* * * * *